(12) United States Patent
Katz (10) Patent No.: US 8,890,952 B2
(45) Date of Patent: Nov. 18, 2014

(54) IMAGING SYSTEM (75) Inventor: Sagi Katz, Yokneam (IL)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 12/511,074

(22) Filed: Jul. 29, 2009

(65) Prior Publication Data

US 2010/0026850 A1 Feb. 4, 2010

Related U.S. Application Data

(60) Provisional application No. 61/084,263, filed on Jul. 29, 2008.

(51) Int. Cl.
*H04N 7/18* (2006.01)
*G01S 17/10* (2006.01)
*G01S 17/89* (2006.01)

(52) U.S. Cl.
CPC ............... *G01S 17/89* (2013.01); *G01S 17/107* (2013.01)
USPC ....................................................... 348/135

(58) Field of Classification Search
None
See application file for complete search history.

(56) References Cited

U.S. PATENT DOCUMENTS

| 4,770,536 | A | 9/1988 | Golberstein |
|---|---|---|---|
| 4,912,336 | A | 3/1990 | Nayar et al. |
| 5,289,227 | A | 2/1994 | Kinjo |
| 6,057,909 | A | 5/2000 | Yahav et al. |
| 6,091,905 | A | 7/2000 | Yahav et al. |
| 6,100,517 | A | 8/2000 | Yahav et al. |
| 6,445,884 | B1 | 9/2002 | Yahav |
| 6,993,255 | B2 | 1/2006 | Braun et al. |
| 7,042,440 | B2 | 5/2006 | Pryor et al. |
| 7,224,384 | B1 | 5/2007 | Iddan et al. |
| 7,227,973 | B2 | 6/2007 | Ishiyama |
| 7,346,196 | B2 * | 3/2008 | Gin ............................... 382/118 |
| 7,764,818 | B2 * | 7/2010 | Sumanaweera et al. ...... 382/131 |
| 2004/0141063 | A1 * | 7/2004 | Maeda et al. ............ 348/207.99 |

(Continued)

FOREIGN PATENT DOCUMENTS

| EP | 0358818 | 3/1990 |
|---|---|---|
| EP | 1176559 | 1/2002 |

(Continued)

OTHER PUBLICATIONS

Written Opinion of the International Searching Authority dated Oct. 16, 2009, Patent Cooperation Treaty, PCT Application No. PCT/IB2009/053289, filed Jul. 29, 2009.

(Continued)

*Primary Examiner* — Chikaodili E Anyikire
*Assistant Examiner* — Frederick Bailey
(74) *Attorney, Agent, or Firm* — Micah Goldsmith; Judy Yee; Micky Minhas (57) ABSTRACT

An imaging system comprising: a light source for illuminating a scene with a known intensity light; a camera having an optic axis and center that images the scene responsive to light reflected by the scene from the illuminating, known intensity light; a range finder controllable to determine distances to surface elements of the scene imaged by the camera; a controller configured to determine reflectivity of a surface element of the scene imaged by the camera responsive to a distance of the surface element from the camera, the known intensity of illuminating light and light from the surface element imaged by the camera.

15 Claims, 5 Drawing Sheets

(56) References Cited

U.S. PATENT DOCUMENTS

| | | | |
|---|---|---|---|
| 2006/0126934 A1* | 6/2006 | Ichimura et al. | 382/181 |
| 2006/0193622 A1 | 8/2006 | Endo | |
| 2007/0091175 A1 | 4/2007 | Iddan et al. | |
| 2007/0146364 A1* | 6/2007 | Aspen | 345/426 |
| 2007/0176927 A1 | 8/2007 | Kato et al. | |
| 2008/0002060 A1 | 1/2008 | DeLuca et al. | |
| 2008/0023587 A1* | 1/2008 | Head et al. | 244/158.4 |
| 2008/0205707 A1* | 8/2008 | Braunecker et al. | 382/106 |
| 2008/0212849 A1 | 9/2008 | Gao | |
| 2011/0187684 A1* | 8/2011 | Amundson et al. | 345/204 |

FOREIGN PATENT DOCUMENTS

| | | |
|---|---|---|
| EP | 1214609 | 12/2004 |
| JP | 4-279811 A | 10/1992 |
| JP | 5-196989 A | 8/1993 |
| JP | 8-292469 A | 11/1996 |
| JP | 10-327301 A | 12/1998 |
| JP | 2000-55616 A | 2/2000 |
| JP | 2001-109894 A | 4/2001 |
| JP | 2001-283216 A | 10/2001 |
| JP | 2002-77718 A | 3/2002 |
| JP | 2002-532704 A | 10/2002 |
| JP | 2006-235254 A | 9/2006 |
| JP | 2007-516525 A | 6/2007 |
| JP | 2007-206797 A | 8/2007 |
| JP | 2008-47925 A | 2/2008 |
| WO | 9701111 | 1/1997 |
| WO | 00/36372 A1 | 6/2000 |
| WO | 01/18563 | 3/2001 |
| WO | 2006/028158 | 3/2006 |
| WO | 2009078002 | 6/2009 |

OTHER PUBLICATIONS

Response to European Office Action dated Mar. 31, 2011, European Patent Office, European Patent Application No. 09786734.5 filed Jul. 29, 2009.
PCT International Search Report PCT/IB2009/053289 dated Oct. 16, 2009.
PCT International Search Report PCT/IB2009/052191 dated Oct. 26, 2009.
Toyama, Kentaro, et al., "Probabilistic Tracking in a Metric Space," Eighth International Conference on Computer Vision, Vancouver, Canada, vol. 2, Jul. 2001, 8 pages.
Chinese Office Action dated Feb. 29, 2012, Chinese Patent Application No. 200980130780.9 filed Jul. 29, 2009, 9 pages.
Partial English Translation of Chinese Office Action dated Feb. 29, 2012, Chinese Patent Application No. 20090130780.9 filed Jul. 29, 2009, 3 pages.
Response to Chinese Office Action dated Oct. 15, 2012, Chinese Patent Application No. 20090130780.9, filed Jul. 29, 2009, 9 pages.
Partial English Translation of Response to Chinese Office Action dated Oct. 15, 2012, Chinese Patent Application No. 200980130780.9, filed Jul. 29, 2009, 6 pages.
Response to Chinese Office Action dated Jun. 29, 2012, Chinese Patent Application No. 200980130780.9, filed Jul. 29, 2009, 20 pages.
Chinese Office Action dated Aug. 15, 2012, Chinese Patent Application No. 200980130780.9, filed Jul. 29, 2009, 5 pages.
Partial English Translation of Chinese Office Action dated Aug. 15, 2012, Chinese Patent Application No. 200980130780.9, filed Jul. 29, 2009, 3 pages
Japanese Office Action dated Dec. 24, 2013, Japanese Patent Application No. 2011-520645, filed Jul. 29, 2009, 7 pages.
Partial English language translation of Japanese Office Action dated Dec. 24, 2013, Japanese Patent Application No. 2011-520645, filed Jul. 29, 2009, 9 pages.
English Translation of Abstract of Japanese Publication No. JP2000-55616, published Feb. 25, 2000, 1 page.
English Translation of Abstract of Japanese Publication No. JP4-279811, published Oct. 5, 1992, 1 page.
English Translation of Abstract of Japanese Publication No. JP2001-109894, published Apr. 20, 2001, 2 pages.
English Translation of Abstract of Japanese Publication No. JP10-327301, published Dec. 8, 1998, 1 page.
English Translation of Abstract of Japanese Publication No. JP2007-516525, published Jun. 21, 2007, 1 page.
English Translation of Abstract of Japanese Publication No. JP5-196989, published Aug. 6, 1993, 2 pages.
English Translation of Abstract of Japanese Publication No. JP2006-235254, published Sep. 7, 2006, 2 pages.
English Translation of Abstract of Japanese Publication No. JP8-292469, published Nov. 5, 1996, 1 page.
English Translation of Abstract of Japanese Publication No. JP2002-532704, published Oct. 2, 2002, 2 pages.
English Translation of Abstract of Japanese Publication No. JP2002-77718, published Mar. 15, 2002, 2 pages.
English Translation of Abstract of Japanese Publication No. JP2008-47925, published Feb. 28, 2008, 2 pages.
English Translation of Abstract of Japanese Publication No. JP2007-206797, published Aug. 16, 2007, 2 pages.
English Translation of Abstract of Japanese Publication No. JP2001-283216, published Oct. 12, 2001, 2 pages.
Response to Japanese Office Action dated Mar. 7, 2014, Japanese Patent Application No. 2011-520645, filed Jul. 29, 2009, 7 pages.
Partial English language translation of claim amendments for Response to Japanese Office Action dated Mar. 7, 2014, Japanese Patent Application No. 2011-520645, filed Jul. 29, 2009, 4 pages.
"Office Action Issued in Japanese Patent Application No. 2011-520645", Mailed Date: May 21, 2014, Filed Date: Jul. 29, 2009, 4 pages. (MS# 329101.06).

* cited by examiner

PRIOR ART

IMAGING SYSTEM

CROSS-REFERENCES TO RELATED APPLICATIONS

The present application claims benefit under 35 U.S.C. §119(e) of U.S. Provisional Application 61/084,263 filed Jul. 29, 2008, the entire content of which is incorporated herein by reference.

FIELD

The invention relates to imaging systems configured to acquire 3D images of a scene.

BACKGROUND

Optical imaging systems are used and configured for an increasing plethora of varied applications, and images provided by the systems are processed to provide different types and qualities of information required by the applications. Among these applications are inspection of manufactured goods and materials, CAD verification, biometric identification, robot vision, geographic surveying and gesture recognition.

In general, as image quality of features in an image of a scene improves, the quality of data provided by the images for a given application improves. Various hardware and/or image processing techniques are used to tailor imaging systems to the applications for which they are used and to provide desired quality and/or features for images they provide.

For example, US Patent Application Publication 2008/0002060 provides a method for removing "red-eye" to improve images of people acquired by a digital camera using a flash. The camera comprises a red-eye filter, which analyzes acquired images for red-eye and modifies the image by changing color of a red-eye area to black. U.S. Pat. No. 6,993,255 describes adjusting illumination of a scene being imaged responsive to a depth map of the image in order to tailor an image of the scene for desired effects. In an embodiment of the invention, the depth map is provided by a time of flight 3D camera. Adjustable lighting is provided by an array of optionally relatively small light sources referred to as "luxels".

The disclosures of the above referenced US Patent Application Publication and Patent are incorporated herein by reference.

SUMMARY

An aspect of some embodiments of the invention relates to providing an, optionally optical, 3D imaging system that determines values of reflectivity for surface elements of an imaged scene responsive to distances of the surface elements from the imaging system.

An aspect of some embodiments of the invention, relates to providing a 3D imaging system that determines values for reflectivity of surface elements of the scene responsive to respective normals to the surface elements.

An aspect of some embodiments of the invention relates to providing a 3D imaging system, that provides an image of a scene responsive substantially only to reflectivity of surface elements of the scene and/or angles, "Lambertian angles", between respective normals to the surface elements and directions along which the surface elements are imaged.

According to an aspect of some embodiments of the invention, the 3D imaging system comprises a light source for illuminating a scene, a camera controllable to image the scene on a photosensitive surface responsive to light from the light source and a range finder for determining distances to surface elements of the scene. For convenience, the photosensitive surface is referred to as a photosurface and is assumed to comprise an array of light sensitive pixels on which the imaging system images a scene.

To determine reflectivity of surface elements of a scene, in accordance with an embodiment of the invention, the light source is controlled to illuminate the scene with a known intensity of light, and light reflected by the surface elements is imaged on the camera photosurface. Distances to surface elements of the scene imaged on the photosurface are determined by the range finder.

In accordance with an embodiment of the invention, the distances are processed to determine a normal to each of the surface elements. A unit vector from each surface element along a direction from the surface element to a pixel of the photosurface on which the surface element is imaged is referred to as an "imaging direction". The surface elements are assumed to be diffusive, Lambertian reflecting surfaces. As a result, an amount of light "$I_p$" registered by a pixel on which a given surface element is imaged is considered substantially proportional to a dot product between the unit normal to the surface and the imaging direction. If θ is the angle, i.e. the Lambertian angle", between the vectors, $I_p$ may be written:

$$I_p = \alpha(I_o/D^4)R \cos\theta. \quad (1)$$

In expression (1), α is a known proportionality constant dependent on optical parameters of the camera and the light source, $I_o$ is intensity of light provided by the light source per unit area of the light source, D is the distance to the surface element and R is the reflectivity of the region. In accordance with an embodiment of the invention, reflectivity R is determined for the region responsive to constraints defined by equation 1.

Optionally, the range finder in a 3D imaging system, in accordance with an embodiment of the invention, comprises a gated, time of flight range finder. The gated time of flight range finder comprises a light source controllable to illuminate the scene with at least one pulse of light and a gated photosurface that images light from the at least one light pulse that is reflected by the scene. The photosurface is gated on for a short period, hereinafter referred to as a "gate", following each of the at least one pulse of light transmitted by the light source. An amount of light registered by a pixel on the photosurface during the gate is used to determine distance to a surface element of the scene imaged on the pixel. Optionally the light source and photosurface used to image a scene is common to the gated time of flight range finder. Various types and configurations of gated time of flight range finders and methods of gating them are described in U.S. Pat. Nos. 6,057,909, 6,100,517, 7,224,384, US patent Publication 2007/0091175 and PCT Application IL2007/001571, the disclosures of which are incorporated herein by reference. For convenience of presentation, a 3D imaging system in accordance with an embodiment of the invention comprising a gated range finder is referred to as a "3D gated imager".

In some embodiments of them invention, the 3D imaging system provides an image of a scene wherein each pixel, an "image pixel", in the image is provided with an intensity value substantially proportional to reflectivity R determined for an element of the scene corresponding to the image pixel. In some embodiments of them invention, the 3D imaging system provides an image of a scene wherein each pixel, an "image pixel", in the image is provided with an intensity value substantially proportional to R cos θ determined for an element of the scene corresponding to the image pixel.

According to an aspect of some embodiments of the invention, features in a scene are identified responsive to reflectivity R and/or Lambertian angles associated with the features.

For example, assume a given material is known to have a particular reflectivity R* for light used to illuminate a scene imaged by a 3D imaging system in accordance with an embodiment of the invention. Regions of the scene may be identified as being formed from the material only if their respective reflectivities R and/or values for R cos θ are consistent with the regions having reflectivity R*. By way of a particular example, if it is desired to identify a region of a scene comprising a person's hand, location of the hand in the scene may be identified by determining if a region of the scene exhibits reflectivity consistent with that of human skin. By way of a further particular example, a person's eyes in an image can be identified, in accordance with an embodiment of the invention, by their relatively high reflectivity for red and IR light that give rise to the well-known red-eye effect in images of people.

According to an aspect of some embodiments of the invention, illumination of a scene imaged by the 3D imaging system is controlled responsive to values of reflectivity of and/or the normals to surface elements of the scene.

Optionally, the 3D imaging system comprises a controllable light source comprising luxels, such as a light source described in U.S. Pat. No. 6,993,255 referenced above to control illumination of a scene responsive to reflectivity of and/or normals to surface elements of the scene. Optionally, the light source is bore sighted with the photosurface on which the scene is imaged.

For example, surface elements of a scene that are determined to have relatively low reflectivity may be illuminated more intensely than surface elements having relatively large reflectivity. Similarly, a surface elements whose normal makes a relatively large angle with their respective imaging directions may be illuminated more, or possibly less intensely than surface elements whose normals make relatively small angles with their respective imaging directions. Alternatively or additionally, illumination of surface elements of a scene exhibiting values for reflectivity in a particular range may be enhanced or diminished to change the way in which the regions appear in an image of the scene provided by the 3D imaging system. For example, in accordance with an embodiment of the invention, red-eye in an image of a person is detected and located responsive to reflectivity of red-eye regions in the image and lighting of a person's face is adjusted to reduce red-eye responsive to detection and location of red-eye.

There is therefore provided in accordance with an embodiment of the invention, an imaging system comprising: a light source for illuminating a scene with a known intensity light; a camera having an optic axis and center that images the scene responsive to light reflected by the scene from the illuminating, known intensity light; a range finder controllable to determine distances to surface elements of the scene imaged by the camera; a controller configured to determine reflectivity of a surface element of the scene imaged by the camera responsive to a distance of the surface element from the camera, the known intensity of illuminating light and light from the surface element imaged by the camera.

Optionally, the controller processes determined distances to define normals to surface elements of the scene imaged by the camera. Optionally, the controller determines reflectivity of a surface element of the scene responsive to the normal to the surface element. Optionally, the controller determines an imaging direction for a surface element imaged by the camera along which imaging direction the camera images light from the surface element. Optionally, the imaging direction is parallel to a line from the surface element to the optic center of the camera. Alternatively, the imaging direction is optionally parallel to the optic axis of the camera.

In some embodiments of the invention, the controller determines reflectivity of a surface element responsive to the imaging direction. Optionally, the controller determines reflectivity of a surface element responsive to a dot product of the normal and a vector parallel to the imaging direction.

In some embodiments of the invention, the controller is configured to identify a feature in the scene responsive to a product of the reflectivity determined for a surface element imaged by the camera times a cosine of an angle between the surface element's imaging direction and normal.

In some embodiments of the invention, the controller is configured to identify a feature in the scene responsive to determined reflectivity of a surface element imaged by the camera.

In some embodiments of the invention, the imaging system comprises a controller configured to provide an image of the scene wherein a gray level of a pixel in the image is substantially equal to a product of the reflectivity determined for a surface element imaged on the pixel times a cosine of an angle between the surface element's imaging direction and normal.

In some embodiments of the invention, the imaging system comprises a controller configured to provide an image of the scene comprising image pixels whose gray levels are substantially proportional to reflectivities determined for surface elements of the scene imaged on the pixels.

In some embodiments of the invention, the range finder comprises a gated time of flight range finder.

In some embodiments of the invention, the imaging system comprises a light source controllable to illuminate different regions of the scene independently of each other with intensities of light responsive to their respective normals.

In some embodiments of the invention, the imaging system comprises a light source controllable to illuminate different regions of the scene independently of each other with intensities of light responsive to their respective reflectivities.

There is further provided in accordance with an embodiment of the invention, a method of determining reflectivity of a surface element of a scene, the method comprising: illuminating the scene with known intensity light; imaging the surface element with light reflected by the surface element from the known intensity light; determining distances to a plurality of surface elements of the scene; determining a normal to the surface element responsive to the determined distances; and determining the reflectivity of the surface element responsive to the normal and an amount of light from the known intensity light that is reflected by the surface element and imaged.

Optionally, the method comprises determining an imaging direction substantially along which light from the surface element is imaged. Optionally, the method comprises determining the reflectivity responsive to the imaging direction. Optionally, the method comprises imaging the scene with a camera having an optic center and determining the imaging direction comprises determining the imaging direction to be a direction parallel to a line from the surface element to the optic center of the camera. Alternatively, the method optionally comprises imaging the scene with a camera having an optic axis and determining the imaging direction comprises determining the imaging direction to be a direction parallel to the optic axis.

In some embodiments of the invention, the method comprises determining reflectivity of a surface element responsive to a dot product of the normal and a vector parallel to the imaging direction.

In some embodiments of the invention, the method comprises identifying a feature in the scene responsive to a product of the reflectivity times a cosine of an angle between the imaging direction and normal.

In some embodiments of the invention, the method comprises identifying a feature in the scene responsive to the reflectivity.

In some embodiments of the invention, the method comprises providing an image of the scene wherein a gray level of a pixel in the image that images the surface element is substantially equal to a product of the reflectivity determined times a cosine of an angle between the imaging direction and normal.

In some embodiments of the invention, the method comprises providing an image of the scene wherein a gray level of a pixel in the image that images the surface element is substantially proportional to the reflectivity.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
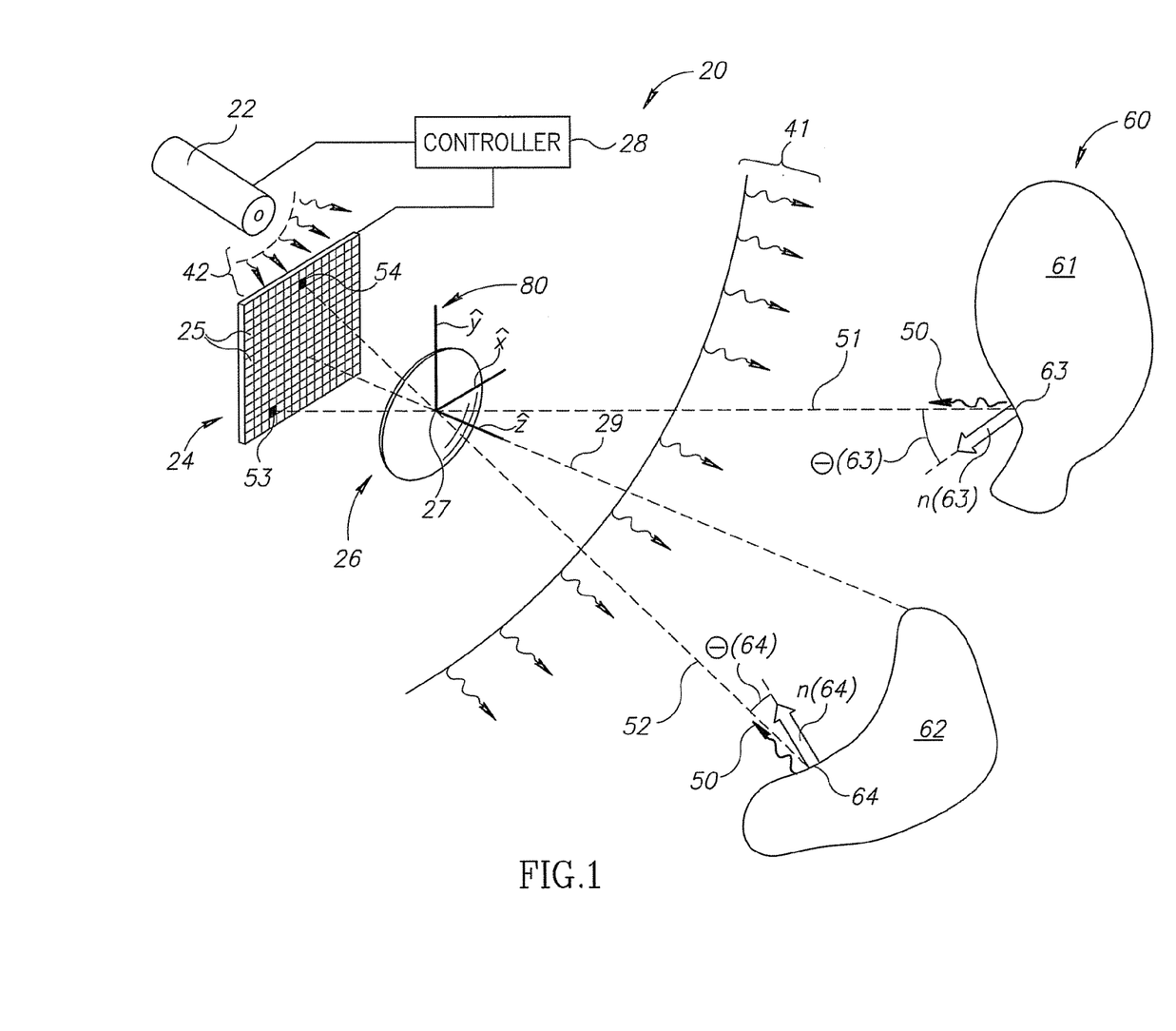
FIG. 1 schematically shows a 3D imaging system imaging a scene to determine reflectivity of surface elements of the scene, in accordance with an embodiment of the invention.

FIG. 1 schematically shows a 3D gated imaging system 20 imaging a scene 60 comprising objects 61 and 62 to determine reflectivity of surface elements of the objects, in accordance with an embodiment of the invention. 3D gated imaging system 20 is, by way of example, assumed to be a 3D gated imager. The 3D gated imager optionally comprises a light source 22 for illuminating scene 60 with at least one pulse of light of optionally infrared (IR) light and a gateable photosurface 24 comprising an array of pixels 25, such as by way of example, a gated CCD or CMOS photosurface. Optionally, the gateable photosurface is a photosurface described in US Patent Publication 2007/0091175 referenced above. A lens or an optical system, represented by a lens 26 having an optical center 27 and optic axis shown with a dashed line 29, collects light from scene 60 and images the collected light on photosurface 24. A controller 28 controls light source 22 and photosurface 24 to synchronize gating of the photosurface with transmission times of the at least one light pulse transmitted by light source 22 to illuminate scene 60 and determine distances to regions of the scene. A coordinate system 80 having origin located at optical center 27 and z-axis coincident with optic axis 29 is used for convenience to reference features of scene 60.

In FIG. 1, by way of example, two IR light pulses 41 and 42, each schematically represented by a dashed arc and wavy arrows, are shown radiated by light source 22 to illuminate scene 60. A pulse of light reflected from a light pulse 41 or 42 by a surface element in scene 60 that is imaged by 3D gated imager is represented by a wavy arrow 50. A wavy arrow 50 is shown for each of surface elements 63 and 64. Each wavy arrow 50 is shown extending from the surface element along a line, i.e. an imaging direction, from the surface element to a pixel 25 in photosurface 24 on which the surface element is imaged. An imaging direction is defined by a line from the surface element that passes through optical center 27 of the optical system represented by lens 26 and ends on the pixel on which the surface element is imaged. Surface elements 63 and 64 have imaging directions 51 and 52 respectively and are imaged respectively on pixels 53 and 54, which are shaded for convenience of presentation.

There are various ways of synchronizing gating of photosurface 24 with light pulses 41 and 42 transmitted by light source 22 to determine distances to surface elements, such as surface elements 63 and 64 of scene 60. Some of these methods are described in U.S. Pat. Nos. 6,057,909, 6,100,517, 7,224,384, US patent Publication 2007/0091175 and PCT Application IL2007/001571 referenced above.

Figure 2:
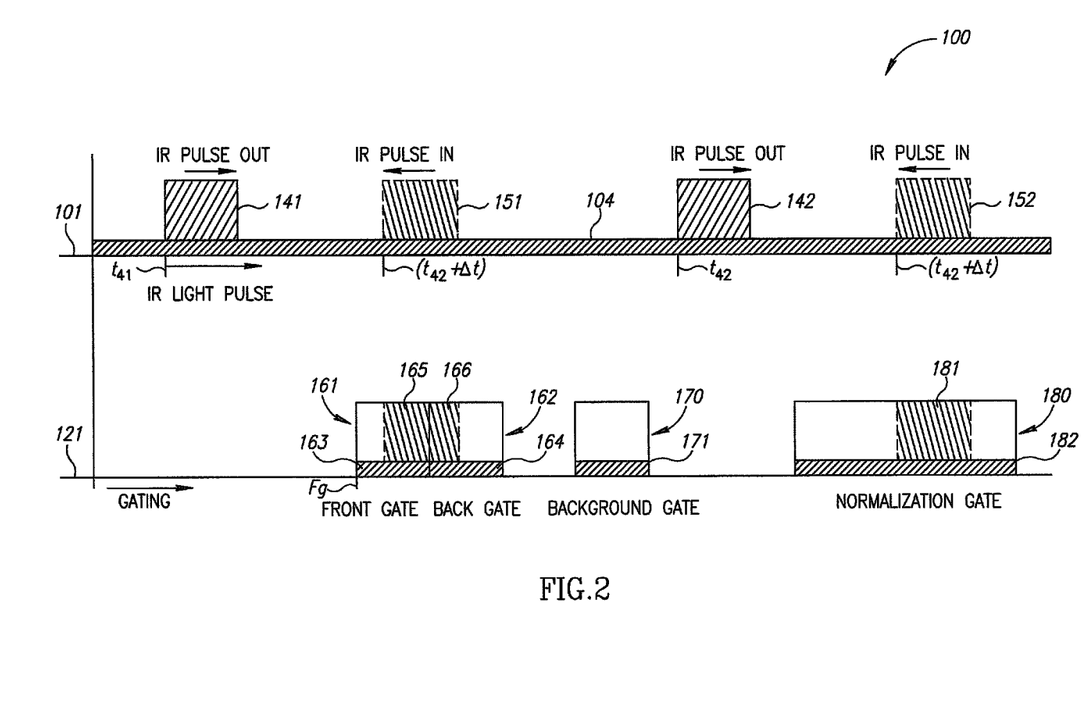
FIG. 2 shows a graph that illustrates synchronization of light pulse and gates of the gated imager shown in FIG. 1.

FIG. 2 schematically shows a graph 100 having time lines 101 and 121 that illustrates an exemplary method of gating photosurface 24 in synchrony with light pulses, such as light pulses 41 and 42 shown in FIG. 1, that are transmitted by light source 22 to determine distances to features in scene 60.

Time line 101 schematically shows timing of transmitted light pulses, 41 and 42 and light pulses, such as light pulses 50 shown in FIG. 1, reflected from the transmitted light pulses by surface elements of scene 60. Transmitted light pulse 41 is represented along time line 101 by a shaded solid-line rectangle 141 having an overhead arrow pointing from left to right indicating that light in the light pulse is outgoing from 3D gated imager 20. Similarly, transmitted light pulse 42 is represented along time line 101 by a shaded solid line rectangle 142 and associated overhead arrow. Light pulses 141 and 142 are assumed to be transmitted by light source 22 at times $t_{41}$ and $t_{42}$ respectively and have a same pulse width "τ". The light pulses are "seated" on a shaded band 104 and height of the IR background band 104 above the time line schematically represents intensity of ambient background IR light.

Pulses of light reflected from light pulses 141 and 142 by an arbitrary given surface element of scene 60 located at a distance "D" from 3D gated imager 20 are represented by shaded dashed-line rectangles 151 and 152 respectively. Each dashed line rectangle has an overhead arrow pointing from right to left to indicate that light in the light pulse is "incoming", back to the 3D gated imager. The reflected light pulses have a pulse width τ equal to the pulse width of the transmitted pulses of which they are reflections. Reflected light pulses 151 and 152 may for example represent light pulses reflected from transmitted light pulses 141 and 142 respectively by region 63 or region 64 shown in FIG. 1.

Letting "c" represent the speed of light, light in reflected light pulses 151 and 152 first reaches 3D gated imager at times $t_{41}+\Delta t$ and $t_{42}+\Delta t$ respectively where $\Delta t=2D/c$ is a round trip time for a photon from light source 22 to the reflecting surface element and back to 3D gated imager 20. Light from a given reflected light pulse continues to be incident on 3D gated imager 20 for a period τ from a time a first photon in the reflected light pulse reaches the 3D imager.

Periods, i.e. gates, for which controller 28 gates photosurface 24 open and pixels 25 in the photosurface are sensitive to light imaged on the photosurface by lens 26, are represented by solid line rectangles along time line 121. By way of example, following transmitted light pulse 141, at a time $t_{Fg}$ photosurface 24 is gated on for a first gate 161 referred to as a "front gate" having a gate width, optionally, equal to the light pulse width τ and a second temporally contiguous "back gate" 162 also, optionally, having a gate width τ. If light in a light pulse reflected from a given surface element of scene 60 reaches 3D gated imager 20 during the front and/or back gate 161 and 162, light from the given surface element will be registered on a pixel that images the surface element during the front and/or back gate respectively. For time $t_{Fg}$ at which front gate 161 starts, light from any region of scene 60 within the field of view of 3D gated imager 20 and at a distance "D" between distances $(c/2)(t_{Fg}-\tau)$ and $(c/2)(t_{Fg}+2\tau)$ will be registered during the front and/or back gate 161 and/or 162.

An amount of light registered by a pixel 25 during a gate comprises IR background light 104 that is collected and imaged by 3D imager 20 during the gate and light reflected from a transmitted light pulse by a given surface element of scene 60 imaged on the pixel that reaches the 3D imager during the gate.

Shaded base regions 163 and 164 in the gates represent amounts of background light 104 registered by the pixel during front and back gates 161 and 162. An amount of light reflected from light pulse 141 that is registered by the pixel on which the given surface element of scene 60 is imaged during front gate 161 or back gate 162 is dependent upon distance in the range from $(c/2)(t_{Fg}-\tau)$ to $(c/2)(t_{Fg}+2\tau)$ at which the given surface element is located. For example, if the given surface element is located at a distance D for which $(c/2)(t_{Fg}-\tau) \leq D \leq (c/2)(t_{Fg})$, the pixel will register reflected light only during the front gate. If $D=(c/2)(t_{Fg})$ the pixel registers substantially all the reflected light from the given surface element that reaches 3D gated imager 20 during front gate 161. If D satisfies the constraint $(c/2)(t_{Fg}) < D < (c/2)(t_{Fg}+\tau)$, the pixel registers reflected light during both the front and the back gates. If $D=(c/2)(t_{Fg}+\tau/2)$, the pixel will register half of the reflected light from the given region during the front gate and half of the reflected light during the back gate. And if $(c/2)(t_{Fg}+\tau) \leq D \leq c/2)(t_{Fg}+2\tau)$ the pixel will register reflected light only during back gate 162.

By way of example, in FIG. 2, assume that the given surface element that reflects light from transmitted light pulse 141 back to 3D imaging system 20 as reflected IR light pulse 151, is surface element 63, which is imaged on pixel 53. Assume further that region 63 is located at a distance D from the imaging system that satisfies the constraint $(c/2)(t_{Fg}) < D < (c/2)(t_{Fg}+\tau)$. As a result, pixel 53 registers light from reflected light pulse 151 during both front gate 161 and back gate 162. Shaded regions 165 and 166 above base regions 163 and 164 in front and back gates 161 and 162 represent amounts of reflected light 151 registered by pixel 53 during the front and back gates respectively.

Amounts of light reflected from a transmitted light pulse that is registered by a given pixel 25 during front gate 161 and/or back gate 162 and the start time $t_{Fg}$ of the front gate relative to a transmitted light pulse as known in the art, is usable to determine distance to a surface element of scene 60 imaged on the given pixel. However, in general, an amount of light reflected from a transmitted light pulse by the surface element that is registered by the given pixel during front and/or back gates 161 and/or 162 is of course not only a function of arrival time of a reflected pulse and background light. The amount of light is also a function, inter alia, of intensity of light in the transmitted pulse, solid angle subtended by lens 26 at the surface element and reflectivity of the surface element for light in the transmitted light pulse.

To provide a value for distance D to the surface element, amounts of light in reflected light pulse 151 registered by the given pixel during front gate 161 and/or back gate 162 is normalized to a total amount of light in the reflected light pulse that reaches 3D imager 20 from the surface element. The registered light is also advantageously corrected for background light. To determine an amount of background light 163 and 164 that pixels 25 in photosurface 24 register during a gate, photosurface 24 is gated on for a period referred to as a "background gate" during a time for which light reflected from a transmitted light pulse (e.g. light pulses 141 and 142 in FIG. 2) does not reach 3D imaging system 20.

In FIG. 2, by way of example, photosurface 24 is indicated as being gated on for a background gate 170 optionally having a gate width equal to τ at a time following arrival of IR reflected pulse 151 at 3D imager 20 for which no light reflected from a transmitted IR pulse, e.g. pulse 141, is incident on the 3D imager. Background light registered by pixel 25 that images the given surface element is schematically indicated by shaded region 171 in gate 170.

Let an amount of light that is used to normalize light reflected from a light pulse 151 that is registered during a front and/or a back gate 161 and 162 by a pixel 25 be referred to as "normalization light". Optionally, to determine an amount of normalization light for normalizing light reflected from a first transmitted light pulse that is registered by a pixel 25 during front and back gates 161 and 162, photosurface 24 is gated on for a relatively long "normalization gate" following transmission of a second light pulse. If the first and second light pulses have a pulse width τ, and the front and back gates a gate width also τ, advantageously the normalization gate has a gate width substantially equal to 4τ. If the front gate starts at time $t_{Fg}$ following transmission of the first light pulse, the normalization gate advantageously begins at at a time $(t_{Fg}-\tau)$ following a time at which the second transmitted pulse is transmitted. The gate width and timing of the normalization gate are such that an amount of light registered by each pixel 25 during the normalization gate is substantially equal to a total amount of light reflected from the first pulse that reaches 3D gated imager 20 from a surface element of scene 64 imaged on the pixel.

In FIG. 2, a normalization gate 180 used to determine normalization light for pixels 25, light pulse 141 and front and back gates 161 and 162 is schematically shown along time line 121. Normalization gate 180 has a gate width equal to 4τ and begins at a time $(t_{Fg}-\tau)$ following $t_2$. Normalization light registered by pixel 53 that images surface element 63 during the normalization gate is schematically indicated by a shaded region 181 in gate 180. A shaded base region 182 in normalization gate 180 represents IR background light registered by the pixel during the normalization gate.

Let amounts of light registered during front, back, background and normalization gates 161, 162, 170 and 180 be represented respectively by $Q_F$, $Q_B$, $Q_{Bg}$ and $Q_N$. Let $Q_F^*$, $Q_B^*$ and $Q_N^*$ be the amounts of light registered by a pixel 25 corrected for background light so that $$Q_F^* = (Q_F - Q_{Bg}) \qquad (2)$$

$$Q_B^* = (Q_B - Q_{Bg}) \qquad (3)$$

$$Q_N^* = (Q_N - 4Q_{Bg}) \qquad (4)$$

Then distance D to a surface element, e.g. region 63 or region 64, of scene 60 imaged on pixel 25 may be determined from the following equations:

$$D = (c/2)[t_{Fg} - (1 - Q_F^*/Q_N^*)\tau] \text{ if } Q_F^* \neq 0 \text{ and } Q_B^* = 0 \quad (5)$$

$$D = (c/2)[t_{Fg} + (1 - Q_F^*/Q_N^*)\tau] \text{ if } Q_F^* \neq 0 \text{ and } Q_B^* \neq 0 \quad (6)$$

$$D = (c/2)[(t_{Fg} + \tau) + (1 - Q_B^*/Q_N^*)\tau] \text{ if } Q_F^* = 0 \text{ and } Q_B^* \neq 0. \quad (7)$$

From the above, it is seen that 3D imager 20 provides a distance map to features of scene 60 imaged on photosurface 24, and in addition, provides an IR light image, i.e. an IR intensity image, of the scene. The distance map comprises a distance D determined for each surface element of scene 60 imaged on photosurface 24. The IR image comprises the amounts of IR light $Q_N$ or $Q_N^*$ registered by each of the pixels.

It is noted that whereas the amounts of registered light $Q_F$, $Q_B$, $Q_{Bg}$, are indicated in FIG. 2 as being determined from a single transmitted pulse 141, the amounts of registered light may of course be determined from a train of light pulses and associated front, back and background gates following each light pulse in the pulse train. Similarly, $Q_N$ may be determined from a train of light pulses and associated normalization gates.

In accordance with an embodiment of the invention, information provided by 3D gated imager 20 is used to determine reflectivity of surface elements of scene 60. In particular, distance information to surface elements and image information for the surface elements, i.e. amounts $Q_N^*$ of IR light imaged on pixels that image the surface elements are used to provide a value for the IR reflectivity of surface elements of the scene.

An imaging direction of a surface element of scene 60 and distance D, as optionally determined by 3D gated imager 20 in accordance with equations (2)-(7), for the surface element provide 3D spatial coordinates for the surface element. For example, imaging directions 51 and 52 (FIG. 1) for surface elements 63 and 64 and distance to the surface elements, provide (x,y,z) coordinates for each of the surface elements, optionally relative to coordinate system 80. The coordinates of a plurality of surface elements define a surface, "$S(x,y,z)$" of which the surface elements are portions. The surface may be defined by an equation of the form $$z - F(x,y) = 0, \quad (8)$$

responsive to coordinates of surface elements on the surface. Whereas the function $F(x,y)$ is definable, for example by any of various curve fitting methods, as a continuous function responsive to coordinates of surface elements provided by light registered on pixels 25, the coordinates naturally provide $F(x,y)$ as a discrete function.

Let a normal unit vector to the surface $S(x,y,z)$ at a location $(x,y,z)$ on the surface be represented by $\hat{\eta}(x,y,z)$. Then $\hat{\eta}(x,y,z)$ has $\hat{x}, \hat{y}, \hat{z}$ components, i.e. direction cosines, equal to, $$\left. \begin{array}{c} \dfrac{(\partial F(x,y)/\partial x)\hat{x}}{\sqrt{(\partial F(x,y)/\partial x)^2 + (\partial F(x,y)/\partial y)^2 + 1}} \\ \dfrac{(\partial F(x,y)/\partial y)\hat{y}}{\sqrt{(\partial F(x,y)/\partial x)^2 + (\partial F(x,y)/\partial y)^2 + 1}} \\ \dfrac{\hat{z}}{\sqrt{(\partial F(x,y)/\partial x)^2 + (\partial F(x,y)/\partial y)^2 + 1}} \end{array} \right\}, \quad (9)$$

where $\hat{x}, \hat{y}, \hat{z}$ are unit vectors along the x, y and z-axes of coordinate system 80. Normals to surface elements 63 and 64 in FIG. 1 are schematically indicated by block arrows labeled $\eta(\mathbf{63})$ and $\eta(\mathbf{64})$.

The partial derivatives in equations (9) may be determined using any of various methods known in the art. For example, assuming that $F(x,y)$ and thereby equation (8) are discrete functions, the partial derivatives may be evaluated using any of various horizontal and vertical image filters, such as Sobel filters, that are responsive to differences in the z-coordinates of adjacent surface elements. By way of example, the partial derivatives for a surface element at a location having coordinates $(x_o, y_o)$ and adjacent surface elements at coordinates $(x_{o-1}, y_o)$, $(x_{o+1}, y_o)$, $(x_o, y_{o+1})$ and $(x_o, y_{o-1})$ are optionally determined as, $$\partial F(x1,y1)/\partial x = (z(x_{o+1}, y_o) - z(x_{o-1}, y_o))/(x_{o+1} - x_{o-1}) \quad (10)$$

$$\partial F(x1,y1)/\partial y = (z(x_o, y_{o+1}) - z(x_o, y_{o-1}))/(y_{o+1} - y_{o-1})$$

On the other hand, if $F(x,y)$ is defined as a continuous function in the region of $(x_o, y_o)$ responsive to coordinates provided by light registered on pixels 25, the partial derivatives may be determined by differentiating the continuous function.

Let $\hat{d}(x, y, z)$ represent a unit vector in an imaging direction, such as imaging directions 51 and 52 in FIG. 1, along which a surface element $\Delta S(x,y,z)$ of surface $S(x,y,z)$ located at $(x,y,z)$ and distance $D(x,y,z)$ from 3D gated imager 20 is imaged by the imager. The direction cosines for the imaging direction and $\hat{d}(x, y, z)$ are those of a line from the location $(x,y,z)$ to the coordinates of pixel 25 of photosurface 24 on which the surface element $\Delta S(x,y,z)$ is imaged. Components of $\hat{d}(x, y, z)$ defined from the imaging direction may be written, $$\left. \begin{array}{c} [x/D(x, y, z)]\hat{x} \\ [y/D(x, y, z)]\hat{y} \\ [z/D(x, y, s)]\hat{z}. \end{array} \right\} \quad (11)$$

The cosine of an angle $\theta(x,y,z)$ between the imaging direction $\hat{d}(x, y, z)$ and the normal $\hat{\eta}(x, y, z)$ to a surface element $\Delta S(x,y,z)$ is given by the dot product, $$\cos \theta(x,y,z) = \hat{\eta}(x,y,z) \cdot \hat{d}(x,y,z). \quad (12)$$

In FIG. 1 angles $\theta(x,y,z)$ for surface elements 63 and 64 are indicated as angles $\theta(\mathbf{63})$ and $\theta(\mathbf{64})$ respectively.

Let the intensity of light provided by light source 22 in a light pulse transmitted to illuminate scene 60 used to provide the IR image of scene 60 be represented by $I_o$. Then intensity of IR light that illuminates a surface element $\Delta S(x,y,z)$ of scene 60 at a distance $D(x,y,z)$ from 3D imager 20 is $I_o/D^2$.

Assuming that $\Delta S(x,y,z)$ is a Lambertian reflector, an amount of light $Q_N^*(x,y,z)$ (see equation 4) registered on a pixel 25 in photosurface 24 that images $\Delta S(x,y,z)$ may be written, $$\left. \begin{array}{l} Q_N^*(x, y, z) = \alpha(I_o/D(x, y, z)^4)R(x, y, z)\cos\theta, \\ \text{or, using equation (12),} \\ Q_N^*(x, y, z) = \alpha[I_o/D(x, y, z)^4]R(x, y, z)\hat{\eta}(x, y, z) \cdot \hat{d}(x, y, z). \end{array} \right\} \quad (13)$$

In expression (13), $\alpha$ is a known proportionality constant dependent on optical parameters of the 3D gated imager 20 and light source 22, and $R(x,y,z)$ is the reflectivity of the surface element.

It is noted that for relatively large values of $D(x,y,z)$, the imaging direction of $\Delta S(x,y,z)$ may be approximated by the direction of optic axis 29 of 3D gated imager 20, which is assumed to be coincident with the z axis of coordinate system 80. For such a case, equation (13) may be approximated by, $$Q_N^*(x,y,z) = \alpha(I_o/D(x,y,z)^4)R(x,y,z)\cos\theta = \alpha(I_o/D(x,y,z)^4)R(x,y,z)\hat{\eta}(x,y,z)\cdot\hat{z}. \quad (14)$$

Using the components for $\hat{\eta}(x,y,z)$ shown in expression (9) to expand the dot product, equation (13) may be written, $$Q_N^*(x, y, z) = \alpha(I_O/D(x, y, z)^4)R(x, y, z)/\frac{1}{\sqrt{(\partial F(x, y)/\partial x)^2 + (\partial F(x, y)/\partial y)^2 + 1}}. \quad (15)$$

In accordance with an embodiment of the invention, reflectivity R(x,y,z) is determined for surface element ΔS(x,y,z) responsive to constraints defined by equation (14) or equation (15). For example, using equation (15) reflectivity R(x,y,z) of surface element ΔS(x,y,z) may be written, $$R(x, y, z) = [Q_N^*(x, y, z)/(\alpha I_O/D(x, y, z)^4)] \sqrt{(\partial F(x, y)/\partial x)^2 + (\partial F(x, y)/\partial y)^2 + 1}. \quad (16)$$

In accordance with an embodiment of the invention, values of reflectivity R(x,y,z) and/or R(x,y,z)cos θ(x,y,z) provided for surface elements of scene 60 are used to provide an image of the scene. Optionally, gray levels in the image are proportional to R(x,y,z) and/or R(x,y,z)cos θ(x,y,z) so that a pixel in the image that corresponds to a given surface element ΔS(x,y,z) of scene 60 has a gray level proportional to R(x,y,z) or R(x,y,z)cos θ(x,y,z).

The inventor has determined that it can be advantageous to use a "reflectivity gray level" image of a scene responsive to R and/or R cos θ to distinguish between various features in the scene. For example, assume that a given feature comprises surfaces having a particular reflectivity R* and that it is desired to determine if the scene comprises the feature oriented so that it has a Lambertian angle greater than a threshold angle $\theta_T$. Then candidates for instances of the oriented feature in the scene are expected to have values for R cos θ in an image of the scene in accordance with an embodiment of the invention, which satisfy a constraint, $$R^* \geq R \cos\theta \geq R^* \cos\theta_T. \quad (17)$$

And candidates for instances of the feature in the scene are located by locating regions of the scene that satisfy equation (17).

Figure 3A:
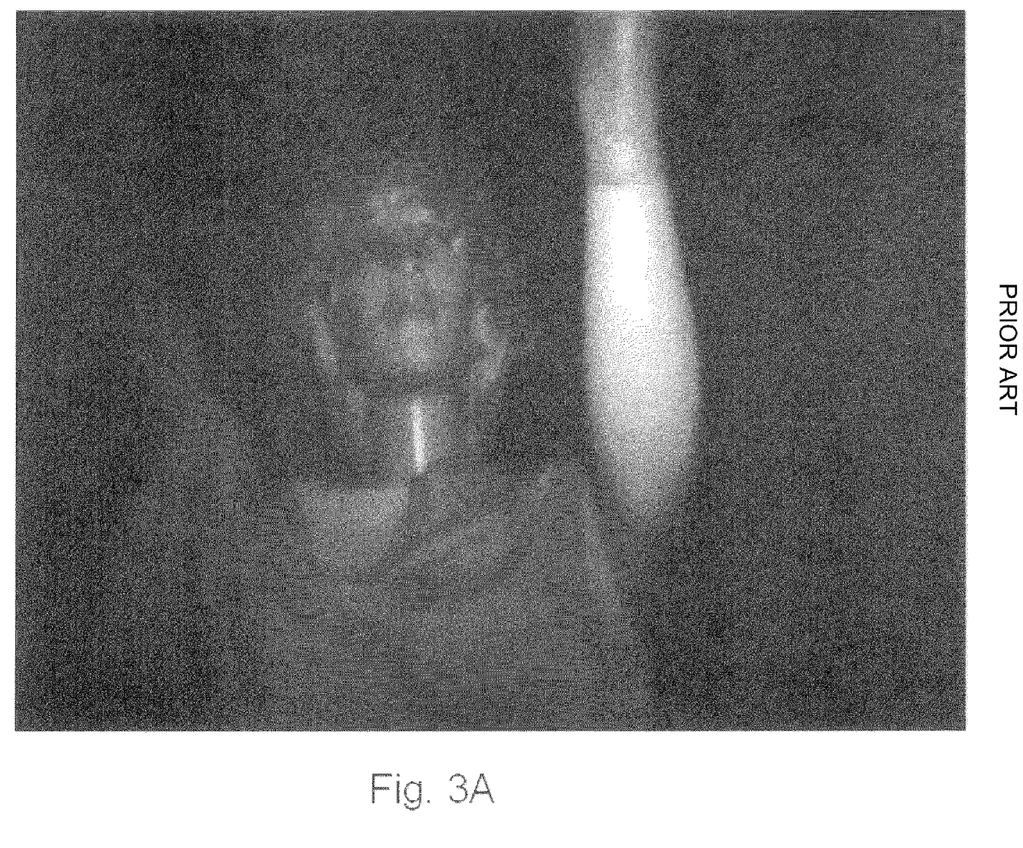
FIG. 3A shows an image of a scene in accordance with prior art.
Figure 3B:
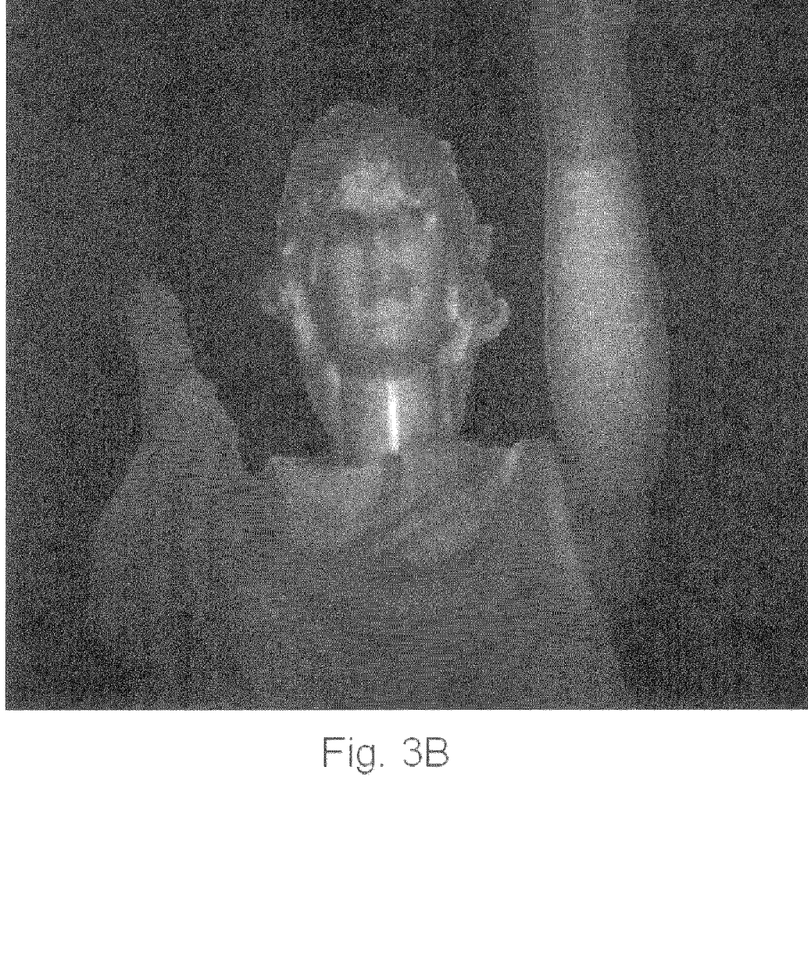
FIG. 3B shows an image of the same scene shown in FIG. 3A, in accordance with an embodiment of the invention.

FIGS. 3A and 3B exhibit how a reflectivity gray level image can be used to identify regions of a scene formed from a same material. The figures respectively show a conventional intensity image 201 of a scene comprising a statue of a woman and a reflectivity gray level image 202 of the scene acquired using a 3D gated imager in accordance with an embodiment of the invention. In conventional image 201 shown in FIG. 3A a forearm of the woman is relatively close to the camera and strongly reflects light illuminating the scene. The forearm appears to be made from a material different from that from which other skin areas of the statue are made. In reflectivity gray level image 202 shown in FIG. 3B, a gray level of a pixel corresponding to a surface element at location coordinates x,y,z is substantially proportional to R(x,y,z)cos θ(x,y,z). In the reflectivity gray level image 202, exposed skin areas of the woman exhibit similar reflectivity and the forearm and face are relatively easily identified as appearing to be formed from a same material.

Whereas in the above example, reflectivities of regions of an image are used to identify regions formed from a same material, reflectivity is used in some embodiments of the invention to identify particular regions of an image. For example, a person's eyes in an image can be identified, in accordance with an embodiment of the invention, by their relatively high reflectivity for red and IR light that give rise to the well-known red-eye effect in images of people. In an embodiment of the invention, the orientation of the person's head is determined responsive to location of the person's eyes determined from their reflectivity.

Figure 4:
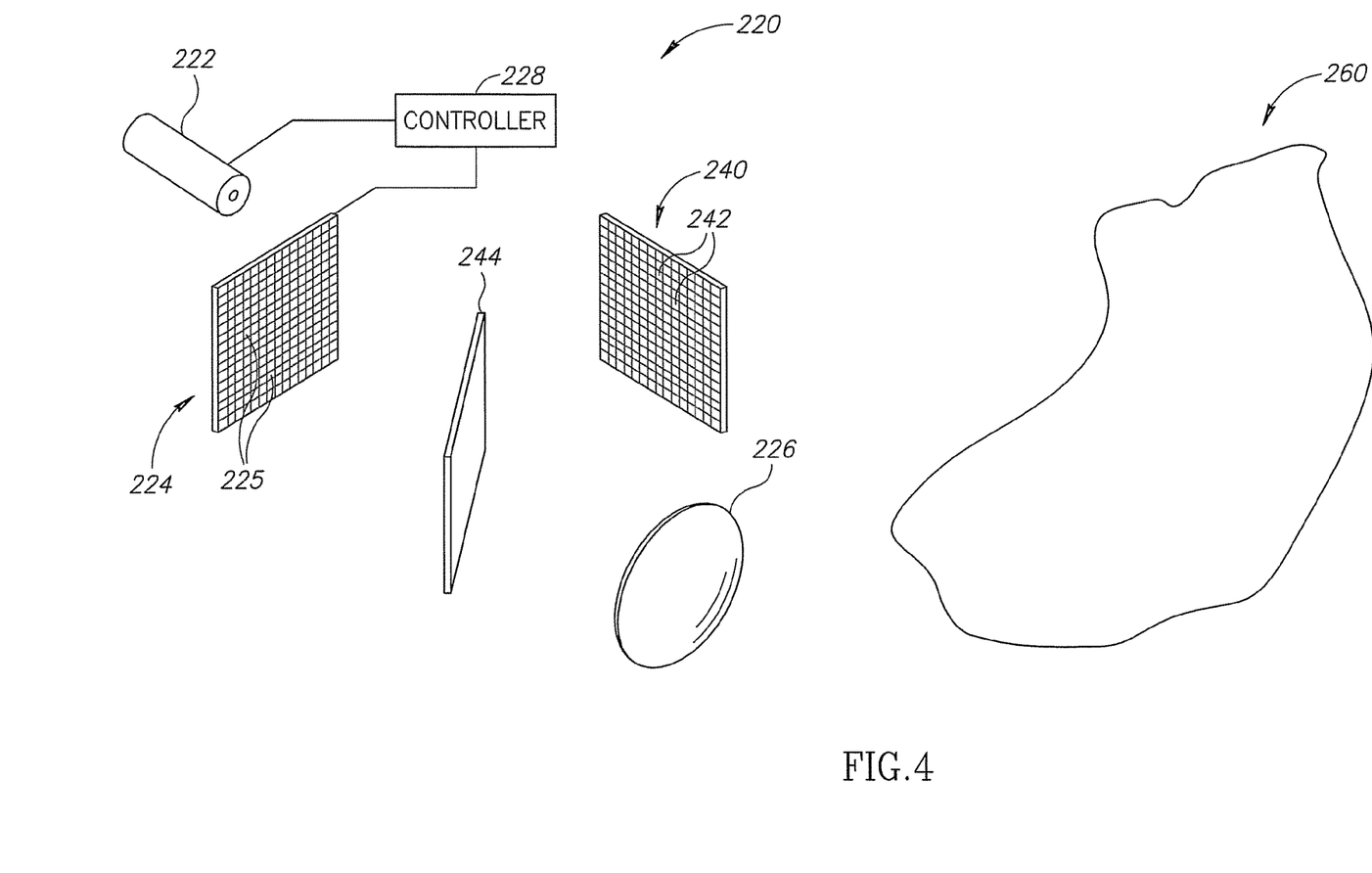
FIG. 4 schematically shows a 3D imaging system comprising a light source in accordance with an embodiment of the invention.

FIG. 4 schematically shows a 3D gated imager 220 comprising a light source 222 for illuminating a scene 260 being imaged with the imager, in accordance with an embodiment of the invention. 3D gated imager 220 is similar to 3D gated imager 20 shown in FIG. 1 except for the addition of light source 240 and components and features optionally associated with the light source. The 3D gated imager comprises a photosurface 224 having pixels 225 and a lens system represented by a lens 226. 3D gated imager 220 optionally provides an image of the scene as well as a depth map of the scene.

Light source 240, hereinafter a "luxel illuminator", optionally comprises a planar array of light emitting elements 242, "luxels", that are independently controllable by a controller 228 to provide desired intensities of light. Optionally, luxels 242 provide visible light to illuminate scene 260 and photosurface 224 is controllable to provide an image of the scene responsive to visible light from luxel illuminator 240 reflected by surface elements in the scene.

Optionally, luxel illuminator 240 is bore sighted with a photosurface 224 and lens 226 using an appropriate beam splitter 244 and optical elements (not shown) as might be required, so that optimally, a virtual image of photosurface 24 is substantially coincident with the luxel illuminator. Optionally, each luxel 242 is homologous with a corresponding pixel 25 of photosurface 224. As a result, each luxel 242 is controllable by controller 228 to provide lighting substantially only to a surface element of scene 260 that is imaged by its corresponding homologous pixel 225. Various configurations of a camera that provides a depth map of scene combined with a bore sighted luxel illuminator are discussed in U.S. Pat. No. 6,993,255 referenced above.

In accordance with an embodiment of the invention, controller 228 controls luxels 242 to illuminate surface elements of scene 260 responsive to reflectivities determined by 3D gated imager for the surface elements. For example, optionally, to provide an enhanced image of a scene, such as scene 260, controller 228 controls luxel illuminator 240 to illuminate surface elements of the scene that are characterized by relatively low reflectivity with relatively increased light intensity.

By way of another example, assume a region of an image of a scene illuminated with IR light pulses exhibits large reflectivity characteristic of red-eye, and that luxels 242 in luxel illuminator 240 are controllable to provide different intensities of RGB light to illuminate the scene. To provide an RGB image of the scene with reduced red-eye effect, controller 228 may optionally control luxel illuminator 240 to illuminate the "red-eye regions" of the scene with reduced intensity of red light.

In the description and claims of the present application, each of the verbs, "comprise" "include" and "have", and conjugates thereof, are used to indicate that the object or objects of the verb are not necessarily an exhaustive listing of members, components, elements or parts of the subject or subjects of the verb.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art. The scope of the invention is limited only by the following claims.

What is claimed is:

1. An imaging system comprising:
a light source for illuminating a scene with a known intensity light;
a camera having an optic axis and center that images the scene responsive to light reflected by surface elements in the scene from the illuminating, known intensity light;
a range finder controllable to determine distances to the surface elements of the scene imaged by the camera;
a controller configured to determine an imaging direction for respective ones of the surface elements imaged by the camera along which imaging direction the camera images light from the respective ones of the surface elements, define normals to the surface elements of the scene imaged by the camera based on the distances to the surface elements, the controller configured to determine reflectivities of the surface elements based on respective distances of the surface elements from the camera, a dot product of the normal to the respective surface elements and a vector parallel to the imaging direction for respective ones of the surface elements, the known intensity of illuminating light, and light from the surface elements imaged by the camera, the controller is configured to provide an image of the scene comprising image pixels whose gray levels are based on the determined reflectivities of the surface elements, the controller configured to identify candidates for a feature in the scene by determining whether the determined reflectivities of the surface elements match a particular reflectivity of the feature,
wherein ones of the surface elements being considered as a candidate for the feature have a value of $R\cos\theta$ that satisfies a constraint:
$R^* \geq R\cos\theta \geq R'\cos\theta_T$, wherein $R^*$ is the particular reflectivity of the feature, $R\cos\theta$ is the determined reflectivity (R) for the surface element being considered as a candidate times a cosine of an angle ($\theta$) between the candidate surface element's imaging direction and the normal to the candidate surface element, and $\theta_T$ is a threshold angle between the candidate surface element's imaging direction and the normal to the candidate surface element.

2. An imaging system according to claim 1, wherein the imaging direction is parallel to a line from a first surface element to the optic center of the camera.

3. An imaging system according to claim 1, wherein the imaging direction is parallel to the optic axis of the camera.

4. An imaging system according to claim 1, wherein the controller is configured to identify the feature in the scene based on a product of the reflectivity determined for a first surface element imaged by the camera times a cosine of an angle between the first surface element's imaging direction and the normal to the first surface element.

5. An imaging system according to claim 1, wherein the controller is configured to provide the image of the scene comprising the image pixels wherein a gray level of a first pixel in the image is substantially equal to a product of the reflectivity determined for a first surface element imaged on the pixel times a cosine of an angle between the first surface element's imaging direction and normal.

6. An imaging system according to claim 1, wherein the range finder comprises a gated time of flight range finder.

7. An imaging system according to claim 1 further comprising a light source controllable to illuminate different regions of the scene independently of each other with intensities of light responsive to their respective normals.

8. An imaging system according to claim 1 further comprising a light source controllable to illuminate different regions of the scene independently of each other with intensities of light responsive to their respective reflectivities.

9. A method comprising:
illuminating a scene including surface elements with known intensity light;
imaging the surface elements at a camera with light reflected by the surface elements from the known intensity light;
determining distances to the surface elements of the scene from the camera based on the imaging;
determining an imaging direction for respective ones of the surface elements imaged by the camera along which imaging direction the camera images light from the respective ones of the surface elements;
determining normals to the surface elements responsive to the determined distances;
determining reflectivities of respective ones of the surface elements responsive to the respective distances of the surface elements from the camera, a dot product of the normal of respective ones of the surface elements and a vector parallel to the imaging direction for respective ones of the surface elements, the known intensity of illuminating light, and light that is reflected by the surface elements and imaged by the camera;
providing a gray level image of the scene in which a gray level of pixels are substantially proportional to the determined reflectivity of the surface elements or substantially equal to a product of the determined reflectivity of the respective surface elements times a cosine of an angle between the imaging direction for respective ones of the surface elements,
identifying candidates for a feature in the scene based on the gray level image,
wherein ones of the surface elements being considered as a candidate for the feature have a value of $R\cos\theta$ that satisfies a constraint:
$R^* \geq R\cos\theta \geq R'\cos\theta_T$, wherein $R^*$ is the particular reflectivity of the feature, $R\cos\theta$ is the determined reflectivity (R) for the surface element being considered as a candidate times a cosine of an angle ($\theta$) between the candidate surface element's imaging direction and the normal to the candidate surface element, and $\theta_T$ is a threshold angle between the candidate surface element's imaging direction and the normal to the candidate surface element.

10. A method according to claim 9 and comprising imaging the scene with a camera having an optic center and determining the imaging direction comprises determining the imaging direction to be a direction parallel to a line from a first of the surface elements to the optic center of the camera.

11. A method according to claim 9 and comprising imaging the scene with a camera having an optic axis and determining the imaging direction comprises determining the imaging direction to be a direction parallel to the optic axis.

12. A method according to claim 9, wherein the gray level of a first pixel in the image that images a first of the surface elements is substantially equal to a product of the reflectivity determined for the first surface element times a cosine of an angle between the imaging direction and normal for the first surface element.

13. A method according to claim 9, wherein the gray level of a first pixel in the image that images a first of the surface elements is substantially proportional to the reflectivity of the first surface element.

14. A method comprising:
    illuminating a scene including surface elements with known intensity light;
    imaging the surface elements at a camera with light reflected by the surface elements from the known intensity light;
    determining distances to the surface elements of the scene from the camera based on the imaging;
    determining imaging directions substantially along which light from respective ones of the surface elements are imaged;
    determining normals to the surface elements responsive to the determined distances;
    determining reflectivities of respective ones of the surface elements responsive to respective distances of the surface elements from the camera, a dot product of the normal of respective ones of the surface elements and a vector parallel to the imaging direction for respective ones of the surface elements, the known intensity of illuminating light, and light that is reflected by the surface elements and imaged by the camera; and
    identifying candidates for a feature in the scene based on a product of the reflectivity determined for a first surface element imaged by the camera times a cosine of an angle between the first surface element's imaging direction and the normal to the first surface element,
    wherein the candidates for the feature have a value of $R\cos\theta$ that satisfies a constraint: $R^* \geq R\cos\theta \geq R'\cos\theta_T$, wherein $R^*$ is a particular reflectivity of the feature, $R\cos\theta$ is the determined reflectivity (R) for the candidate times a cosine of an angle ($\theta$) between the candidate's imaging direction and the normal to the candidate, and $\theta_T$ is a threshold angle between the candidate's imaging direction and the normal to the candidate.

15. The method of claim 14, wherein the identifying candidates for a feature in the scene based on a product of the reflectivity determined for a first surface element imaged by the camera times a cosine of an angle between the first surface element's imaging direction and the normal to the first surface element comprises:
    determining whether the scene comprises a feature oriented such that the angle between the normal of the first surface element and the imaging direction for the first surface element is less than $\theta_T$.

* * * * *